UNITED STATES PATENT OFFICE 2,468,592

INSECTICIDAL COMPOSITION CONTAINING CHLORALIMINES

Stephen C. Dorman, Berkeley, Calif., assignor to Shell Development Company, San Francisco, Calif., a corporation of Delaware No Drawing. Application August 14, 1944, Serial No. 549,487

9 Claims. (Cl. 167—22)

This invention relates to new and novel compounds which are particularly suitable for killing noxious insects and the like. More specifically, the invention is concerned with insecticidal compositions containing N-substituted chloral imines.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, and free from injurious effect and offensive odor to human beings and tendency to stain walls, fabrics, etc.

It is an object of the present invention to provide an insecticidal composition which is highly toxic to insects but of low toxicity to man and other warm-blooded animals. Another object is to provide new insecticidal compositions which can be prepared from readily available domestic and inexpensive materials. A further object is to provide an improved insecticidal composition containing a fast-acting synthetic toxicant which is stable toward light. A further object of this invention is to provide an activator for toxic plant extracts such as pyrethrum and derris resin or rotenone in insecticidal compositions.

I have found that chloral imine derivatives which are N-substituted are particularly effective and highly active insecticidal agents. These compounds may be represented by the general formula

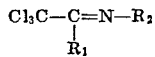

wherein $R_1$ is preferably hydrogen but may be lower alkyl, such as methyl, ethyl, propyl, isopropyl, etc., or a substituted lower alkyl radical, and $R_2$ may be a saturated or unsaturated aliphatic, aromatic, or heterocyclic radical, particularly of more than 5 carbon atoms. The preferred compounds are those in which $R_2$ in the above formula is an aliphatic radical, particularly an alicyclic radical. Suitable aliphatic radicals include hexyl, normal octyl, iso-octyl, normal decyl, isodecyl, dodecyl, tetradecyl, cetyl, stearyl, trimethyl octadecyl, hexenyl, propargyl, geranyl, oleyl, allylhexyl, cyclohexyl, allylcyclohexyls, diallylcyclohexyls, isopropylcyclohexyls, secondary butyl cyclohexyls, dimethyl cyclohexyls, trimethylcyclohexyls (e. g., 3,3,5-trimethylcyclohexyl), endomethylene cyclohexyl, cyclohexenyl, dimethyl cyclohexenyls, vinyl cyclohexenyls, methylcyclohexadienyls, cycloheptenyl, etc. Also, $R_2$ in the above formula may be an aromatic radical, such as, for example, phenyl, methallylphenyl, tolyl, xylyl, vinylphenyl, butylphenyls, 4-isobutylphenyl, naphthyl, methyl-naphthyl, triallyl naphthyl, anthryl, etc., or an heterocyclic radical, such as pyridyl, sulfoanyl, methyl sulfolanyl, pyrrolyl, thioenyl, furyl, butyl carbothionyl, octyl carbothionyl, etc. In general, there may be included in the rings above-mentioned such atoms or groups as for example,

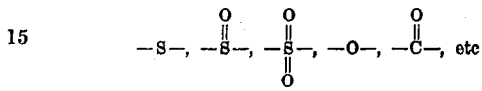

N-substituted chloral imines may be used, which also have in the molecule one or more of the following groups: sulfo, amine, hydroxy, carboxy, amide, mercapto, keto, ether, ester, lactone, lactam, ketal, acetal, halogen, halohydrin, epoxide, cyanohydrin, azo, diazo, thiazo, osazo, thioether, thioimino, cyano, thiocyano, etc.

The most desirable compound of the present class of compounds is N-3,3,5-trimethylcyclohexyl chloral imine.

The preferred compounds, the N-alkylated alicyclic chloral imines and especially N-3,3,5-trimethylcyclohexyl chloral imine, are new compounds, useful for other purposes besides in insectides. These compounds may be prepared, for example, by condensing alkylated alicyclic amines with chloral or chloral hydrate under the usual dehydrating conditions.

The N-substituted chloral imines, either alone or in combination with other active or inactive substances, may be applied to plants, animals, fabrics and the like, by spraying, dusting, pouring, dipping, etc., in the form of concentrated liquids, solutions, suspensions, dusting powders, and the like, containing such concentration of the active principle as is most suited for the particular purpose at hand. They may be applied, for example, in the form of dilute solutions, in a suitable solvent or mixture of solvents, containing, for instance, acetone, petroleum distillate, lignite tar oils, hydrogenated hydrocarbons, paraffin oils, naphthenes, chlorinated hydrocarbons, chlorinated ethers, fenchyl and bornyl alcohols, mono- and poly-hydric alcohols, glycol ethers, or the like or mixtures thereof.

The present compounds may be advantageously used in combination with other insecticides or fungicides such as pyrethrum, derris resins, rotenone, nicotine, lime-sulphur, Bordeaux mixture, copper sulfate, copper carbonates, sulphur, mercury compounds, sodium, calcium and lead arsenates, iron sulfate, phenol, paradichlorobenzene, unsaturated chlorides, higher unsaturated amides, alkene sulfides, thiuram sulfides, thiocyanates, thiocyano esters, isothiocyanates, ethylene glycol ether of pinene, butyl mesityl oxide oxalate, polyhalogenated compounds, such as 1,1-di-parachlorophenyl 2,2,2-trichloroethane, unsaturated cyclic ketols, such as di-isophorone and its homologues, obtained by condensation of lower ketones, such as acetone, methyl ethyl ketone, etc., according to U. S. Patent 2,307,482, and the like.

As will be readily apparent, the most desirable N-substituted chloral imine and solvent, or solvent mixture, or combination with other active and inactive ingredients, will depend considerably upon the particular use for which the material is intended.

For use in household insecticides, N-substituted chloral imines are preferably dissolved in a light hydrocarbon oil such as highly refined, odorless kerosene or kerosene distillate with or without the addition of other insecticides and sprays. Ordinarily from about 1% to 25% and preferably from 2% to 8% of the present toxicants are used in such sprays.

When solutions of the N-substituted chloral imines in odorless base kerosene are placed on filter paper and exposed to air, the liquid evaporates leaving substantially no stain behind, which feature is of particular advantage in household insecticides.

The present compounds may also be mixed with or absorbed by finely divided solid materials, such as wood flour, talc, clay, bentonite, sulphur, and carbon black, and used as dusting insecticides.

Modified Peet-Grady tests were made with the N-substituted chloral imine of the present invention. The general test is fully described in the 1940 "Blue Book," published by the publisher of "Soap and Sanitary Chemicals" periodical, on pages 193 to 197, as the large group method. Briefly, the test as practiced consists of releasing 100 to 150 flies in an air-conditioned case 6 x 6 x 6 feet and spraying them with 6 ml. of insecticide. After 10 minutes' exposure the number of flies which are incapacitated or "knocked down" is noted and all flies transferred to a cage and allowed to recuperate in fresh air for 24 hours, when the dead flies are counted. For the purpose of this study the percentages knocked down at 10 minutes and killed at 24 hours were recorded. The results obtained by testing in the above manner N-3,3,5-trimethylcyclohexyl chloral imine in highly refined, odorless kerosene with added pyrethrum and, for comparison, as a standard, pyrethrum alone in said kerosene are given in the following table:

| Test No. | Amount of N-3,3,5-trimethylcyclohexyl chloral imine | Percent by vol. of Pyrethrum Extract | Percent 10 min. Knockdown | Percent 24 hour kill |
|---|---|---|---|---|
| 1 | | 5 | | 38 |
| 2 | 5 gms./100 ml. | 5 | 98 | 91 |
| 3 | do | 0 | 75 | 22 |

Besides the control of houseflies (*Musca domestica*), the compositions containing the present N-substituted chloral imines may be used for eradicating or controlling various pests, such as insects, e. g., aphids, diabrotica, red spiders, thrips, etc., bacteria and fungi, such as Aspergillus, Penicillium, *Sclerotium rolfsii*, etc.

I claim as my invention:

1. An insecticidal composition comprising a carrier and an N-substituted chloral imine toxic agent having the general formula

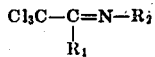

wherein R₁ is selected from the group consisting of hydrogen, lower alkyl and substituted lower alkyl radicals, and R₂ represents a radical chosen from the group consisting of aliphatic hydrocarbon, aromatic hydrocarbon, alicarbocyclic and heterocyclic radicals.

2. An insecticidal composition comprising a carrier and a chloral imine derivative which is N-substituted with a alicarbocyclic radical.

3. An insecticidal composition comprising a carrier and a chloral imine derivative which is N - substituted with alkylated alicarbocyclic radical.

4. An insecticidal composition comprising an insecticidal plant extract from the class consisting of pyrethrum and rotenone and a chloral imine derivative which is N-substituted with a radical selected from the group consisting of aliphatic hydrocarbon, aromatic hydrocarbon, alicarbocyclic hydrocarbon, and heterocyclic radicals.

5. An insecticidal composition comprising pyrethrum and a chloral imine derivative which is N-substituted with an aliphatic radical.

6. A plant spray insecticide comprising a mineral spray oil, an emulsifying agent, and a chloral imine derivative which is N-substituted with a radical selected from the group consisting of aliphatic hydrocarbon, aromatic hydrocarbon, alicarbocyclic hydrocarbon, and heterocyclic radicals.

7. A dust insecticide comprising a finely divided absorptive substance and a chloral imine derivative which is N-substituted with an alicarbocyclic radical and the imino nitrogen atom is directly linked to a ring carbon atom.

8. A house hold insecticide comprising a light hydrocarbon oil and N-3,3,5-trimethylcyclohexyl chloral imine.

9. A household insecticide comprising a light hydrocarbon oil, pyrethrum, and N-3,3,5-trimethylcyclohexyl chloral imine.

STEPHEN C. DORMAN.

REFERENCES CITED

The following references are of record in the file of this patent:

UNITED STATES PATENTS

| Number | Name | Date |
|---|---|---|
| 2,087,132 | Taub et al. | July 13, 1937 |
| 2,261,735 | Gertler | Nov. 4, 1941 |
| 2,329,074 | Muller | Sept. 7, 1943 |

FOREIGN PATENTS

| Number | Country | Date |
|---|---|---|
| 112,216 | Germany | June 25, 1900 |

OTHER REFERENCES

"Ber. deut. Chem.," Paal et al., vol. 25, page 2970.

"Soap and Sanitary Chemicals," Jan. 1943, by Roarck, pages 95 and 96.

"Ber. deut. Chem.," Bergmann et al., vol. 58, page 1042.

"Journal of Economic Entomology," vol. 30, No. 1, pages 158–166 by Kearns et al.

"Chemical Abstracts," 1939, page 7760, by Hirwe et al.